United States Patent
Kim et al.

(10) Patent No.: US 9,854,605 B2
(45) Date of Patent: Dec. 26, 2017

(54) METHOD AND APPARATUS FOR TRANSMITTING UPLINK FRAME IN WIRELESS LAN

(71) Applicant: LG ELECTRONICS INC., Seoul (KR)

(72) Inventors: Jeongki Kim, Seoul (KR); Kiseon Ryu, Seoul (KR); Giwon Park, Seoul (KR); Hangyu Cho, Seoul (KR); Suhwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/109,565

(22) PCT Filed: Nov. 20, 2014

(86) PCT No.: PCT/KR2014/011154
§ 371 (c)(1),
(2) Date: Jul. 1, 2016

(87) PCT Pub. No.: WO2015/102228
PCT Pub. Date: Jul. 9, 2015

(65) Prior Publication Data
US 2016/0330764 A1 Nov. 10, 2016

Related U.S. Application Data

(60) Provisional application No. 61/923,173, filed on Jan. 2, 2014, provisional application No. 62/034,167, filed on Aug. 7, 2014.

(51) Int. Cl.
*H04W 74/02* (2009.01)
*H04W 74/00* (2009.01)
(Continued)

(52) U.S. Cl.
CPC ......... *H04W 74/02* (2013.01); *H04W 74/004* (2013.01); *H04W 74/0816* (2013.01); *H04L 5/0033* (2013.01); *H04W 84/12* (2013.01)

(58) Field of Classification Search
CPC .. H04L 5/0033; H04W 74/004; H04W 74/02; H04W 74/0816; H04W 84/12
See application file for complete search history.

(56) References Cited

U.S. PATENT DOCUMENTS

2005/0053015 A1* 3/2005 Jin .................. H04W 74/02
370/254
2005/0135284 A1* 6/2005 Nanda .............. H04W 52/383
370/294
(Continued)

FOREIGN PATENT DOCUMENTS

KR 101014502 B1 2/2011
WO 2004039022 A2 5/2004
(Continued)

*Primary Examiner* — Dung B Huynh
(74) *Attorney, Agent, or Firm* — Lee, Hong, Degerman, Kang & Waimey

(57) ABSTRACT

Disclosed are a method and an apparatus for transmitting an uplink frame in a wireless LAN. The method for transmitting an uplink frame in a wireless LAN may comprise: a step in which an STA receives a downlink PPDU from an AP through a downlink dedicated channel; a step in which the STA performs a first channel switching from the downlink dedicated channel to a general channel on the basis of information about TXOP duration for transmitting the downlink PPDU if STA indication information included in the received downlink PPDU does not indicate the STA and a pending uplink frame is present in the STA; a step in which the STA performs a channel access for transmitting the uplink frame via the general channel on a time resource corresponding to the TXOP duration; and a step in which the STA performs a second channel switching from the general (Continued)

channel to the downlink dedicated channel on the basis of the information about TXOP duration.

10 Claims, 15 Drawing Sheets

(51) Int. Cl.
*H04W 74/08* (2009.01)
*H04L 5/00* (2006.01)
*H04W 84/12* (2009.01)

(56) References Cited

U.S. PATENT DOCUMENTS

| | | | | |
|---|---|---|---|---|
| 2005/0226183 A1* | 10/2005 | Penumetsa | ......... | H04W 76/023 370/329 |
| 2005/0237984 A1* | 10/2005 | Benveniste | ....... | H04W 72/1242 370/338 |
| 2006/0092871 A1* | 5/2006 | Nishibayashi | ........ | H04L 1/1671 370/328 |
| 2006/0291436 A1* | 12/2006 | Trainin | ................. | H04L 1/1685 370/338 |
| 2007/0060168 A1* | 3/2007 | Benveniste | ........... | H04W 74/04 455/450 |
| 2008/0107156 A1* | 5/2008 | Wentick | ................. | H04B 1/713 375/134 |
| 2009/0310578 A1* | 12/2009 | Convertino | ......... | H04W 76/043 370/338 |
| 2010/0008318 A1* | 1/2010 | Wentink | .............. | H04W 74/006 370/329 |
| 2010/0034158 A1* | 2/2010 | Meylan | ................. | H04L 1/1854 370/329 |
| 2010/0046455 A1* | 2/2010 | Wentink | ................ | H04W 36/06 370/329 |
| 2011/0222408 A1* | 9/2011 | Kasslin | ................. | H04L 41/083 370/241 |
| 2012/0113952 A1* | 5/2012 | Kneckt | ............. | H04W 72/0406 370/330 |
| 2012/0120944 A1* | 5/2012 | Yang | ......................... | H04L 7/04 370/350 |
| 2012/0134324 A1* | 5/2012 | Chu | .................. | H04W 74/0816 370/329 |
| 2012/0218983 A1* | 8/2012 | Noh | ..................... | H04B 7/0452 370/338 |
| 2012/0327870 A1* | 12/2012 | Grandhi | ................ | H04W 28/06 370/329 |
| 2013/0077554 A1* | 3/2013 | Gauvreau | .............. | H04L 5/001 370/312 |
| 2013/0128831 A1 | 5/2013 | Calcev et al. | | |
| 2013/0188565 A1* | 7/2013 | Wang | .................. | H04W 72/121 370/329 |
| 2013/0229996 A1* | 9/2013 | Wang | ................ | H04W 72/0413 370/329 |
| 2013/0286959 A1* | 10/2013 | Lou | ........................ | H04W 72/04 370/329 |
| 2014/0003414 A1* | 1/2014 | Choudhury | ......... | H04W 74/006 370/347 |
| 2014/0307653 A1* | 10/2014 | Liu | ..................... | H04W 74/006 370/329 |
| 2016/0105836 A1* | 4/2016 | Seok | ................... | H04W 72/042 370/331 |

FOREIGN PATENT DOCUMENTS

| | | |
|---|---|---|
| WO | 2013115618 A1 | 8/2013 |
| WO | 2013191439 A1 | 12/2013 |

* cited by examiner

FIG. 1
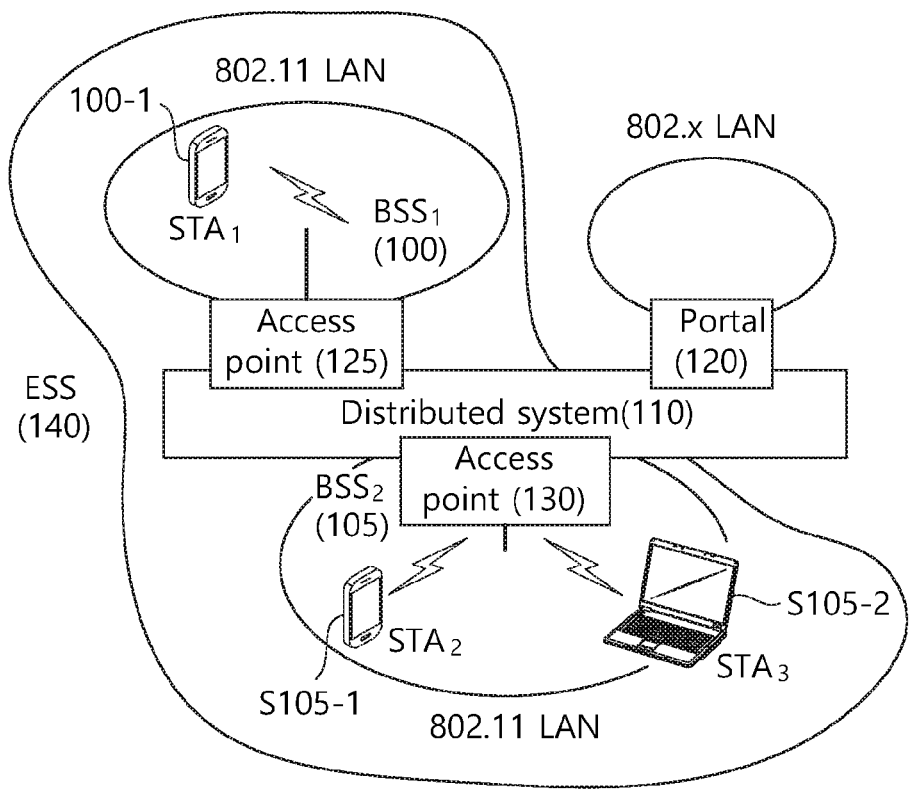
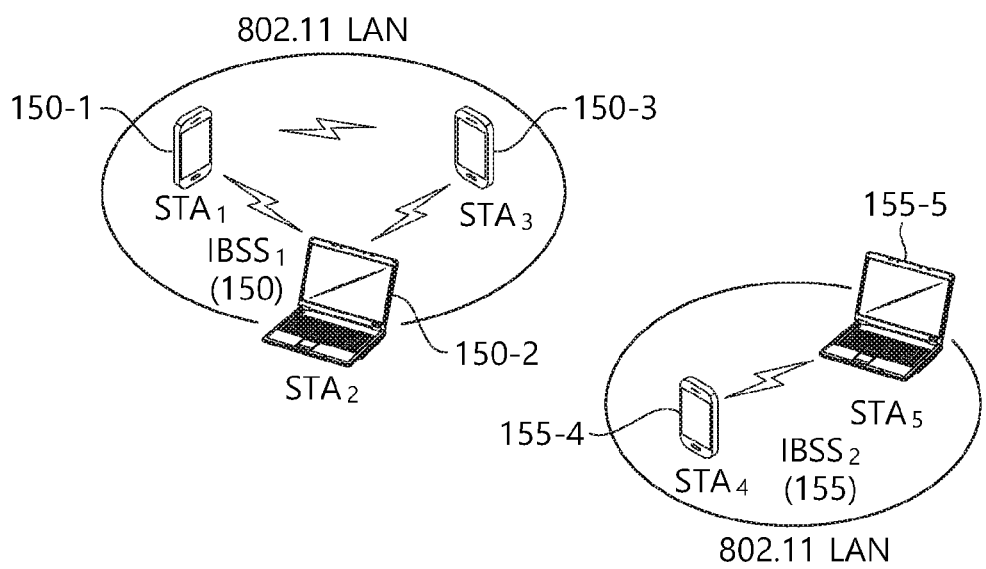

METHOD AND APPARATUS FOR TRANSMITTING UPLINK FRAME IN WIRELESS LAN

CROSS-REFERENCE TO RELATED APPLICATIONS

This application is the National Stage filing under 35 U.S.C. 371 of International Application No. PCT/KR2014/011154, filed on Nov. 20, 2014, which claims the benefit of U.S. Provisional Application No. 61/923,173, filed on Jan. 2, 2014, and 62/034,167, filed on Aug. 7, 2014, the contents of which are all hereby incorporated by reference herein in their entirety.

BACKGROUND OF THE INVENTION

1. Field of the Invention

The present invention relates to wireless communications, and more particularly, to a method and apparatus for transmitting an uplink frame in a wireless local area network (WLAN).

2. Related Art

In wireless LAN systems, as a method for a plurality of stations (STAs) to share a wireless medium, a distributed coordination function (DCF) may be used. The DCF is based on a carrier sensing multiple access with collision avoidance (CSMA/CA).

Generally, when an STA is operated under the DCF access environment, but that a medium has not been used for longer than a DCF interframe space (DIFS) period (i.e., in the case of being idle), the STA may transmit the medium access control (MAC) protocol data unit (MPDU) of which a transmission is imminent. In the case that it is determined that a medium is on use by a carrier sensing mechanism, the STA may determine the size of contention window (CW) using a random backoff algorithm, and perform a backoff procedure. In order to perform the backoff procedure, the STA may select a random value within the CW, and determine the backoff time based on the selected random value.

When a plurality of STAs trying to access a medium, the STA that has the shortest backoff time among a plurality of STAs may access the medium and the remaining STAs may interrupt the remaining backoff time and wait until the transmission of the STA that accesses the medium is completed. After the frame transmission of the STA that accesses the medium is completed, the remaining STAs may perform contention with the remaining backoff time, and may acquire transmission resources. In such a way, in the conventional WLAN system, a single STA performs transmission or reception of the frame with an AP by occupying total transmission resources through a single channel.

SUMMARY OF THE INVENTION

An object of the present invention is to provide a method for transmitting an uplink frame in a WLAN.

Another object of the present invention is to provide an apparatus for transmitting an uplink frame in a WLAN.

In an aspect, a method for transmitting an uplink frame in wireless local network (WLAN) may include receiving, by a station (STA), a downlink physical layer protocol data unit (PPDU) from an access point (AP) through a downlink oriented channel, performing, by the STA, a first channel switching from the downlink oriented channel to a normal channel based on information on a transmission opportunity (TXOP) duration for transmitting the downlink PPDU, when indication information of a reception STA of the downlink PPDU does not indicate the STA and there is an uplink frame which is pending on the STA, performing, by the STA, a channel access for transmitting the uplink frame through the normal channel on a time resource that corresponds to the TXOP duration, and performing, by the STA, a second channel switching from the normal channel to the downlink oriented channel based on the information on the TXOP duration, wherein the downlink oriented channel may be used for a transmission of the downlink PPDU based on non-contention by the AP and a transmission of a response frame in response to the downlink PPDU by the STA, wherein the downlink oriented channel may not be used for a transmission of an independent uplink frame by the STA, and wherein the independent frame may be an uplink frame which is not the response frame among uplink frames transmitted from the STA to the AP.

In another aspect, a station (STA) for transmitting an uplink frame in wireless local network (WLAN) may include a radio frequency (RF) unit configured to transmit or receive a radio signal, and a processor operatively connected to the RF unit, wherein the processor is configured to perform: receiving a downlink physical layer protocol data unit (PPDU) from an access point (AP) through a downlink oriented channel, performing a first channel switching from the downlink oriented channel to a normal channel based on information on a transmission opportunity (TXOP) duration for transmitting the downlink PPDU, when indication information of a reception STA of the downlink PPDU does not indicate the STA and there is an uplink frame which is pending on the STA, performing a channel access for transmitting the uplink frame through the normal channel on a time resource that corresponds to the TXOP duration, and performing a second channel switching from the normal channel to the downlink oriented channel based on the information on the TXOP duration, wherein the downlink oriented channel may be used for a transmission of the downlink PPDU based on non-contention by the AP and a transmission of a response frame in response to the downlink PPDU by the STA, wherein the downlink oriented channel may not be used for a transmission of an independent uplink frame by the STA, and wherein the independent frame may be an uplink frame which is not the response frame among uplink frames transmitted from the STA to the AP.

Advantageous Effects

The AP which is trying to transmit a downlink frame by configuring the channel for transmitting and receiving a separate downlink frame may transmit a downlink frame to an STA by avoiding a channel access contention with the STA. In addition, the AP may perform a communication with a plurality of STAs by operating the normal channel in which both of an uplink and a downlink are available with a downlink oriented channel. Consequently, a transmission rate of a frame may be increased in a WLAN.

BRIEF DESCRIPTION OF THE DRAWINGS

FIG. 1 is a concept view illustrating the structure of a wireless local area network (WLAN).

DESCRIPTION OF EXEMPLARY EMBODIMENTS

Figure 2:
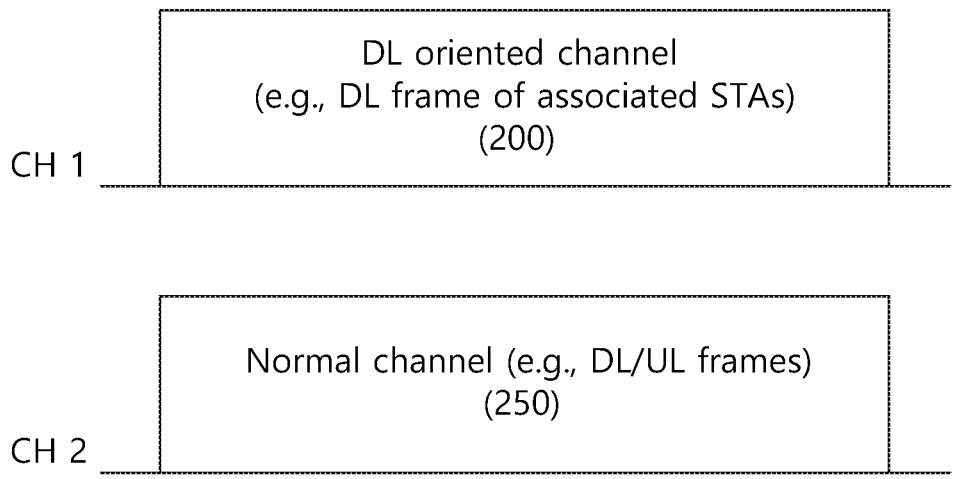
FIG. 2 is a concept view illustrating a WLAN channel according to an embodiment of the present invention.

FIG. 1 is a concept view illustrating the structure of a wireless local area network (WLAN).

An upper part of FIG. 1 shows the structure of the IEEE (institute of electrical and electronic engineers) 802.11 infrastructure network.

Referring to the upper part of FIG. 1, the WLAN system may include one or more basic service sets (BSSs, 100 and 105). The BSS 100 or 105 is a set of an AP such as AP (access point) 125 and an STA such as STA1 (station) 100-1 that may successfully sync with each other to communicate with each other and is not the concept to indicate a particular area. The BSS 105 may include one AP 130 and one or more STAs 105-1 and 105-2 connectable to the AP 130.

The infrastructure BSS may include at least one STA, APs 125 and 130 providing a distribution service, and a distribution system (DS) 110 connecting multiple APs.

The distribution system 110 may implement an extended service set (ESS) 140 by connecting a number of BSSs 100 and 105. The ESS 140 may be used as a term to denote one network configured of one or more APs 125 and 130 connected via the distribution system 110. The APs included in one ESS 140 may have the same SSID (service set identification).

The portal 120 may function as a bridge that performs connection of the WLAN network (IEEE 802.11) with other network (for example, 802.X).

In the infrastructure network as shown in the upper part of FIG. 1, a network between the APs 125 and 130 and a network between the APs 125 and 130 and the STAs 100-1, 105-1, and 105-2 may be implemented. However, without the APs 125 and 130, a network may be established between the STAs to perform communication. The network that is established between the STAs without the APs 125 and 130 to perform communication is defined as an ad-hoc network or an independent BSS (basic service set).

A lower part of FIG. 1 is a concept view illustrating an independent BSS.

Referring to the lower part of FIG. 1, the independent BSS (IBSS) is a BSS operating in ad-hoc mode. The IBSS does not include an AP, so that it lacks a centralized management entity. In other words, in the IBSS, the STAs 150-1, 150-2, 150-3, 155-4 and 155-5 are managed in a distributed manner. In the IBSS, all of the STAs 150-1, 150-2, 150-3, 155-4 and 155-5 may be mobile STAs, and access to the distribution system is not allowed so that the IBSS forms a self-contained network.

The STA is some functional medium that includes a medium access control (MAC) following the IEEE (Institute of Electrical and Electronics Engineers) 802.11 standards and that includes a physical layer interface for radio media, and the term "STA" may, in its definition, include both an AP and a non-AP STA (station).

The STA may be referred to by various terms such as mobile terminal, wireless device, wireless transmit/receive unit (WTRU), user equipment (UE), mobile station (MS), mobile subscriber unit, or simply referred to as a user.

Hereinafter, in the embodiments of the present invention, the data (or frame) transmitted from an AP to an STA may be expressed by the term, a downlink data (or downlink frame), and the data (or frame) that is transmitted from an STA to an AP may be expressed by the term, an uplink data (or uplink frame). Further, the transmission from an AP to an STA may be expressed by the term, a downlink transmission, and the transmission from an STA to an AP may be expressed by the term, an uplink transmission.

The network (a stadium, a station, an exhibition, etc.) of high density has been considered as the next WLAN environment. In such a WLAN environment, the amount of downlink data that is transmitted from an AP to an STA may be relatively greater than the amount of uplink data that is transmitted from an STA to an AP.

However, currently, an AP contends for accessing a channel (e.g., enhanced distributed channel access (EDCA)) with an STA at the same time in order to transmit a downlink frame. In the network of high density, the collision between an AP and an STA may be increased, when the downlink data transmission of an AP is failed, transmission rate of the downlink data may be more decreased since the size of contention window increases exponentially. In addition, a large amount of traffic and a long transmission opportunity (TXOP) in the network of high density may increase the contention and the collision between an AP and an STA, or between STAs.

Accordingly, the data transmitted to the last STA among the downlink data pending on an AP is transmitted lately, and therefore, may not satisfy the quality of service (QoS) of a user. The transmission time of downlink data is even time out and a packet may be discarded in the STA. Such a situation may be fatal in a real-time service such as an audio/video streaming.

Hereinafter, in the embodiments of the present invention, a method for increasing downlink data throughput will be described.

Subsequently, it will be described below by assuming the case that an AP is operated based on two radio frequency (RF) units (or RF interfaces) and an STA is operated based on a single RF unit.

FIG. 2 is a concept view illustrating a WLAN channel according to an embodiment of the present invention.

In FIG. 2, a downlink oriented channel or a downlink dedicated channel 200 for a communication between an AP and an STA and a normal channel 250 are shown.

In the downlink oriented channel 200 shown in FIG. 2, the transmission of a downlink frame and the transmission of a response frame in response to the downlink frame may be performed. In the normal channel 250, a transmission or a reception of an uplink frame or a downlink frame may be performed. The normal channel 250 may be expressed by the term, a legacy channel.

In other words, the downlink oriented channel 200 allows for the AP to transmit a downlink physical layer protocol data unit (PPDU) based on non-contention and allows for the STA to transmit the response frame in response to the downlink PPDU only, but may restrict for the STA to transmit an independent uplink frame. The independent uplink frame may be an uplink frame which is not the response frame among the uplink frames that are transmitted from an STA to an AP. Even for the case of the transmission of the downlink physical layer protocol data unit (PPDU) based on non-contention, the backoff may be performed by considering a collision with the STA which is included in another BSS (e.g., overlapped basic service set (OBSS)).

In the normal channel 250, the transmission of a downlink PPDU based on contention by an AP and the transmission of the response frame in response to the downlink PPDU by an STA, and the transmission of an independent uplink frame by an STA may be allowed.

For example, an AP may allocate a part of available channels (e.g., a part of secondary channels) to the downlink oriented channel 200.

The channel allocation of 80 MHz channel+80 MHz channel may be used for the normal channel 250 and the downlink oriented channel 200. In this case, one 80 MHz channel may be set as the normal channel and the remaining 80 MHz channel may be set as the downlink oriented channel. The normal channel 250 may include a primary channel and a part of secondary channels, and the downlink oriented channel 200 may include the remaining secondary channels.

The channel allocation of 40 MHz channel+40 MHz channel and the channel allocation of 20 MHz channel+20 MHz channel in addition to the channel allocation of 80 MHz channel+80 MHz channel may also be used for the normal channel 250 and the downlink oriented channel 200.

An AP may transmit a downlink frame to a single STA through the downlink oriented channel 200 based on a single RF unit among a plurality of RF unit, and receive the uplink frame that is transmitted by other STA based on another RF unit.

For example, after performing a channel access through the normal channel 250, an STA may receive a downlink frame through the downlink oriented channel 200 by setting the downlink oriented channel 200 as a basic channel. When the downlink oriented channel 200 is the basic channel, the STA may perform a channel switching to the normal channel 250 only in the case of transmitting an uplink frame, and stay on the downlink oriented channel 200 on the other time resources (or time intervals). For example, in the case that the uplink frame that is transmitted from an STA to an AP is pending or an AP requests a transmission of uplink frame to an STA, the STA may be switched from the downlink oriented channel 200 to the normal channel and transmit the uplink frame to the AP through the normal channel 250.

In the case that the STA that has a single RF unit is switched from the downlink oriented channel 200 to the normal channel in order to transmit an uplink frame, the STA may not receive a downlink frame from an AP through the downlink oriented channel 200. Accordingly, it is required to restrict the transmission of downlink frame to the STA through the downlink oriented channel 200 of the AP.

Furthermore, an STA is required to transmit an uplink frame by switching to the normal channel on the time resource which is determined that the downlink frame that is going to be transmitted by an AP is not existed.

Hereinafter, in the embodiments of the present invention, a particular method for receiving a downlink frame through the downlink oriented channel by an STA and transmitting an uplink frame through the normal channel will be described.

Figure 3:
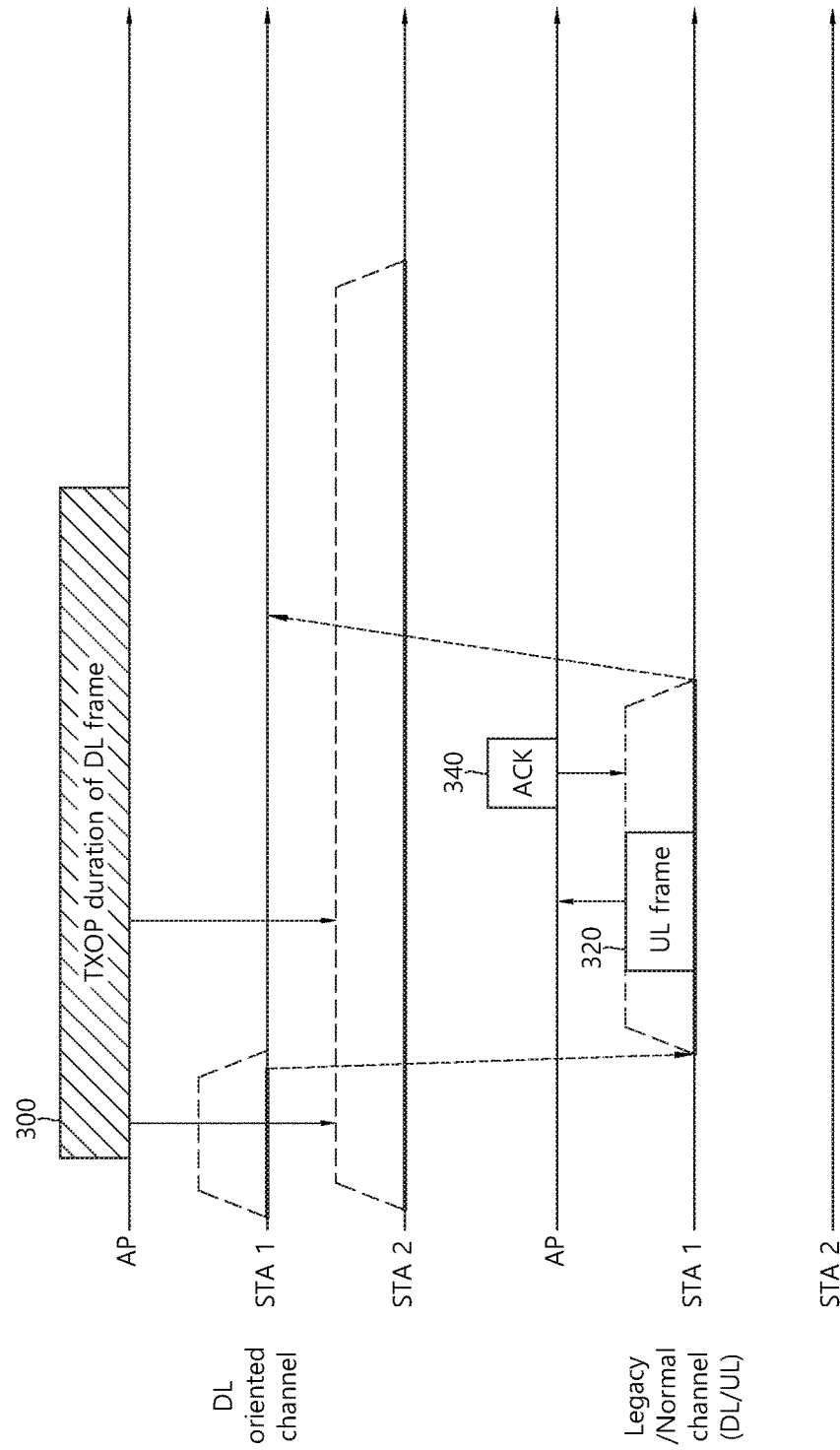
FIG. 3 is a concept view illustrating a method for transmitting an uplink frame by an STA according to an embodiment of the present invention.

FIG. 3 is a concept view illustrating a method for transmitting an uplink frame by an STA according to an embodiment of the present invention.

In FIG. 3, a method for transmitting an uplink frame is shown by an STA that is switched from the downlink oriented channel to the normal channel by considering a transmission opportunity (TXOP). The TXOP may mean an authority of the STA which is to use a medium for a specific time resource for a frame exchange sequence. The frame exchange sequence may mean a transmission of at least one frame and/or a reception of at least one frame.

Referring to FIG. 3, an AP may transmit a downlink frame to other STA through the downlink oriented channel. The AP may acquire the TXOP for the downlink oriented channel based on the downlink frame. For example, the TXOP may be configured based on the information included in the PPDU header included in the physical layer protocol data unit (PPDU) that carries the downlink frame, or based on the transmission of a separate frame. The PPDU header may include a PHY header or a PHY preamble.

The STA may perform switching from the downlink oriented channel to the normal channel in order to transmit the uplink frame by considering the TXOP of the downlink frame that is transmitted to another STA by the AP. For example, the STA may determine whether to perform the channel switching by considering TXOP duration 300.

The STA may determine whether it is available to transmit an uplink frame 320 through the normal channel and/or to receive a response frame 340 from the AP in response to the uplink frame 320 during the TXOP duration 300.

For example, it may assumed the case that the downlink frame is not a frame targeting the STA (e.g., the case that a reception STA's indication information of a downlink PPDU that delivers the downlink frame does not indicate the STA), and the uplink frame pending on the STA is existed. In such a case, the STA may perform switching from the downlink oriented channel to the normal channel by considering the transmission opportunity (TXOP) duration for transmitting the downlink PPDU. At the moment, the channel switching may be performed when the TXOP duration is longer than a threshold switching time, and the threshold switching time may be determined based on the time required to transmit the uplink frame of the STA. Particularly, the threshold switching time may be determined by considering at least one piece of the information among a size of the uplink data that is pending on the STA, a channel state, a transmission timing of the response frame in response to the uplink frame, and so on.

That is, in the case that it is available to transmit the uplink frame 320 through the normal channel and/or to receive the response frame 340 in response to the uplink frame 320 during the TXOP duration 300, the STA may perform the channel switching from the downlink oriented channel to the normal channel After the channel switching, when the STA performs a channel access through the normal channel and the channel access is successful, the STA may transmit the uplink frame 320 and receive the response frame 340 in response to the uplink frame 320 from the AP.

Figure 4:
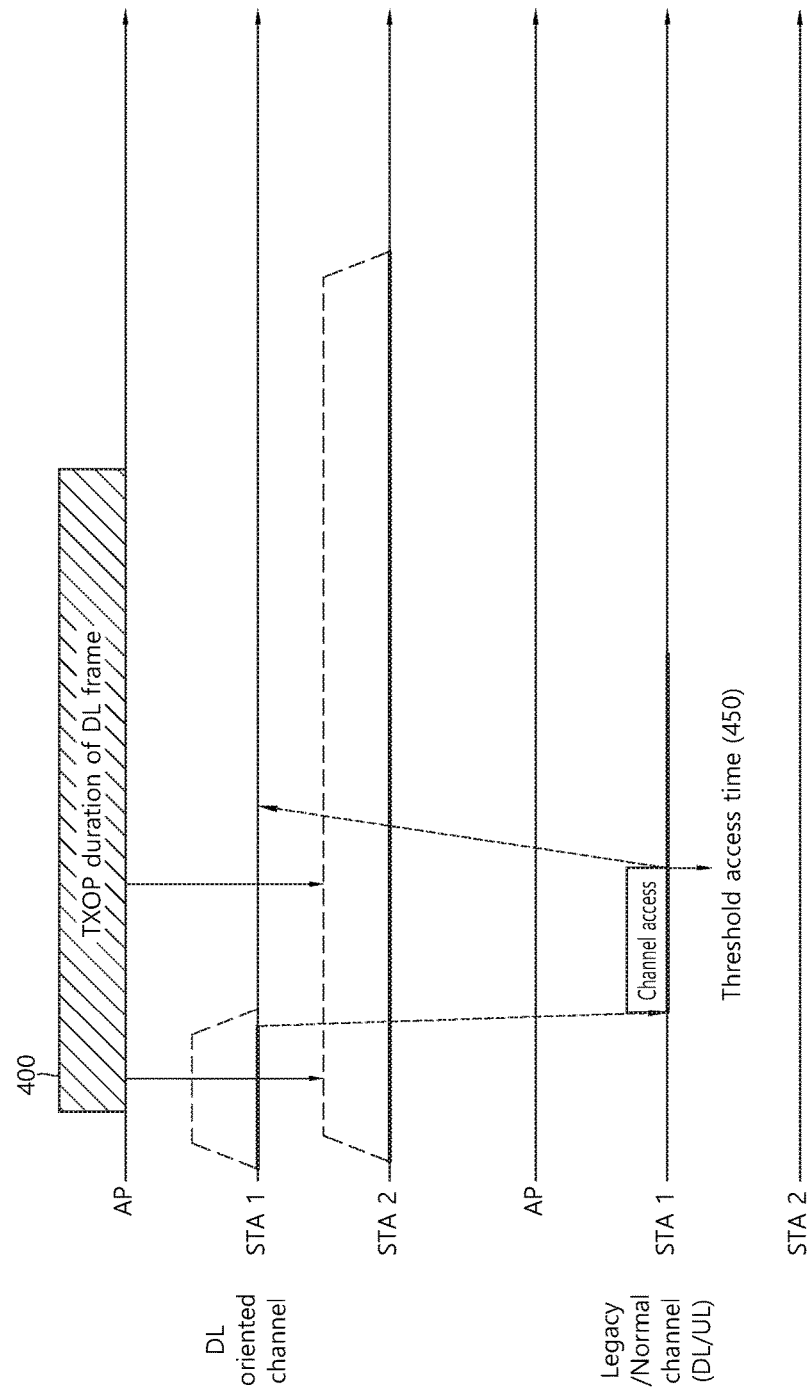
FIG. 4 is a concept view illustrating a method for transmitting an uplink frame by performed an STA according to an embodiment of the present invention.

FIG. 4 is a concept view illustrating a method for transmitting an uplink frame by performed an STA according to an embodiment of the present invention.

FIG. 4 shows a method for an STA to transmit an uplink frame by being switched from the downlink oriented channel to the normal channel by considering a TXOP.

Referring to FIG. 4, when a transmission of an uplink frame is not available during TXOP duration 400, the STA may perform a channel switching from the normal channel to the downlink oriented channel again. As described above, the TXOP duration 400 may be acquired based on the downlink frame that is transmitted to another STA through the downlink oriented channel by an AP.

The STA may perform a channel access through the normal channel (e.g., the channel access based on the EDCA or the DCF). When the STA fails to acquire a medium by succeeding the channel access until a threshold access time 450, the STA may perform the channel switching from the normal channel to the downlink oriented channel.

For example, the threshold access time 450 may be threshold timing for completing the procedure of a transmission of the uplink frame and/or a transmission of a response frame in response to the uplink frame during the TXOP duration. The threshold access time 450 may be determined by considering at least one piece of the information among the TXOP duration 400, a size of the uplink data that is pending on the STA, a channel state, a transmission timing of the response frame in response to the uplink frame, and so on.

Figure 5:
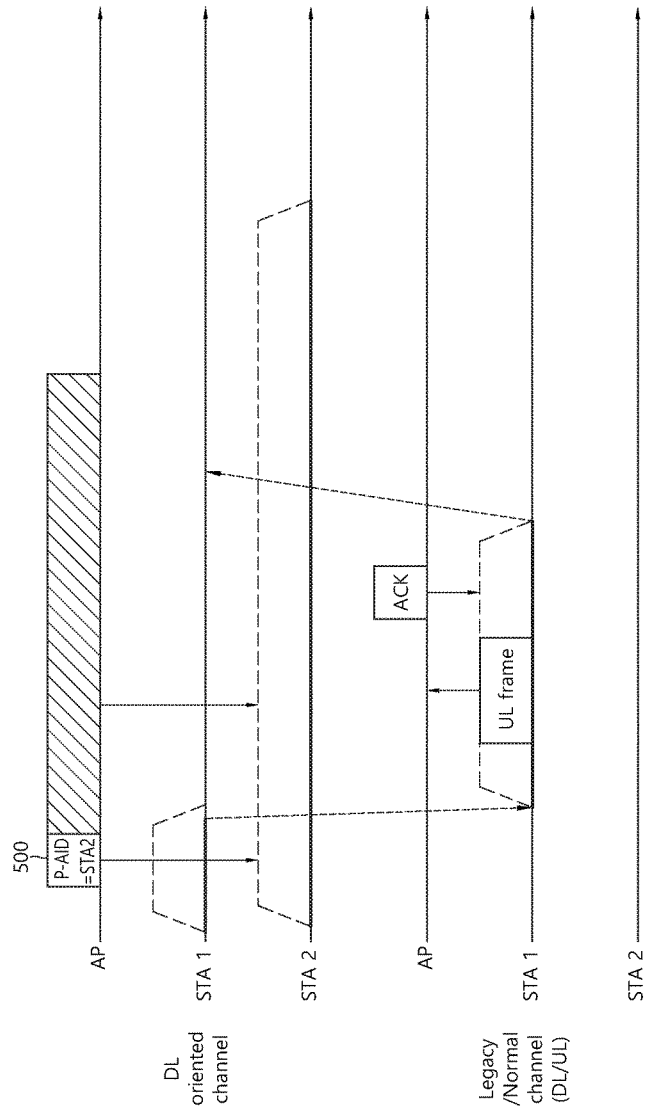
FIG. 5 is a concept view illustrating a method for transmitting an uplink frame by performed an STA according to an embodiment of the present invention.

FIG. 5 is a concept view illustrating a method for transmitting an uplink frame by performed an STA according to an embodiment of the present invention.

FIG. 5 shows a method for an STA to transmit an uplink frame by being switched from the downlink oriented channel to the normal channel by considering the identifier information of the STA included in a downlink frame.

Referring to FIG. 5, the downlink PPDU that is transmitted by an AP may include the information on the STA that is to receive the downlink PPDU. For example, the header of the downlink PPDU may include the identifier information (reception STA identifier information 500) that indicates the STA to receive the downlink PPDU. For example, the reception STA identifier information 500 may be the partial identifier (PID) information of the STA.

When the reception STA identifier information (e.g., the PID information) 500 included in the PPDU header of the downlink PPDU which is transmitted by the AP indicates STA2, only the STA2 may receive the downlink PPDU from the AP through the downlink oriented channel. The STA2 may decode the received downlink PPDU.

When the reception STA identifier information (e.g., the PID information) 500 included in the PPDU header of the downlink PPDU which is transmitted by the AP does not indicate STA1, the STA1 may not decode subsequent fields to the field that includes the reception STA identifier information 500. When the transmission duration required to transmit the subsequent fields to the field that includes the reception STA identifier information 500 is a threshold switching time or more, the STA1 may perform the channel switching from the downlink oriented channel to the normal channel, and transmit the downlink frame through the normal channel.

Alternately, when the time interval until the frame exchange sequence based on the downlink PPDU that is transmitted to the STA2 is terminated (or during the TXOP duration which is configured based on the downlink PPDU) is a threshold switching time or more, the STA1 may perform the channel switching from the downlink oriented channel to the normal channel, and transmit the downlink frame through the normal channel. For example, the frame exchange sequence based on the downlink PPDU may mean transmission and reception of the downlink PPDU and the response frame in response to the downlink PPDU.

Figure 6:
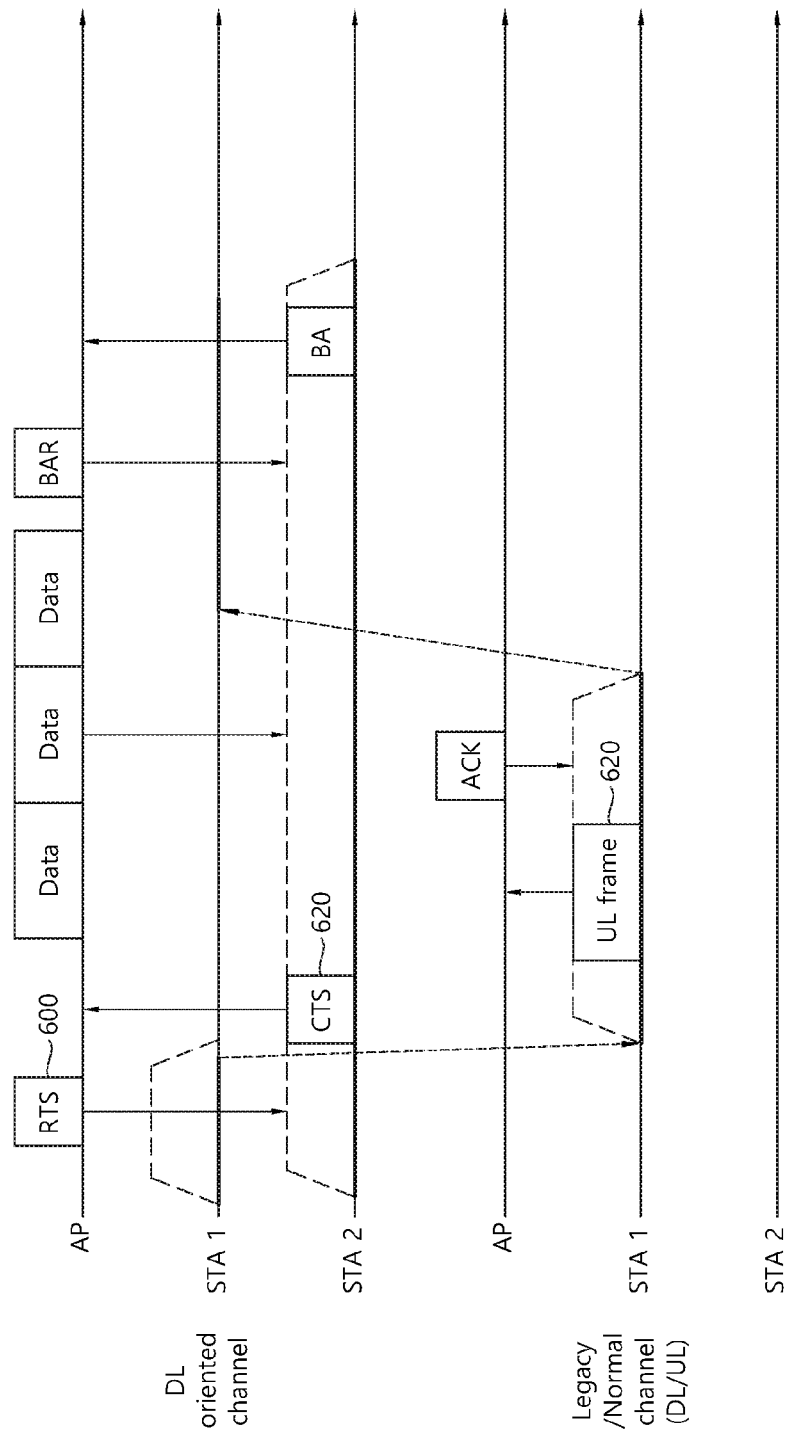
FIG. 6 is a concept view illustrating a method for transmitting an uplink frame performed by an STA according to an embodiment of the present invention.

FIG. 6 is a concept view illustrating a method for transmitting an uplink frame performed by an STA according to an embodiment of the present invention.

FIG. 6 shows a method for an STA to transmit an uplink frame by being switching from the downlink oriented channel to the normal channel by considering the TXOP which is configured based on the reception and transmission of a RTS frame 600/CTS frame 650.

Referring to FIG. 6, an STA1 may receive the RTS frame 600 which is transmitted by an AP. In the case that the RTS frame 600 is not a frame targeted to the STA1 (in the case that the RTS frame 600 is a frame for an STA2), the STA1 may configure a network allocation vector (NAV) based on the RTS frame 600. For example, the STA1 may configure the NAV based on the duration field which is included in the RTS frame 600. The duration field included in the RTS frame 600 may include the duration information of the CTS frame 650 which is to be transmitted by the STA2, the data (or management) frame which is to be transmitted to the STA2 and the ACK frame for the data (or management) frame which is to be transmitted by the STA2.

When there is the uplink frame which is pending to the STA1, the STA1 may transmit an uplink frame 620 on the time resource that corresponds to the NAV configuration interval. The STA1 may perform the channel switching from the downlink oriented channel to the normal channel on the time resource that corresponds to the NAV configuration interval, and may transmit the uplink frame 620 to an AP through the normal channel.

In FIG. 6, the case is shown that the TXOP is configured on the downlink oriented channel based on the transmission and reception of the RTS frame 600/CTS frame 650. However, instead of the transmission and reception of the RTS frame 600/CTS frame 650, the TXOP may be configured based on the transmission and reception of a short data frame and an ACK frame. For example, the short data frame may be a null frame. The null frame may be a frame that includes a header only except a data payload. In such a case, the STA may transmit the uplink frame 620 on the time resource that corresponds to the NAV configuration interval which is configured based on the transmission and reception of the short data frame and the ACK frame.

Figure 7:
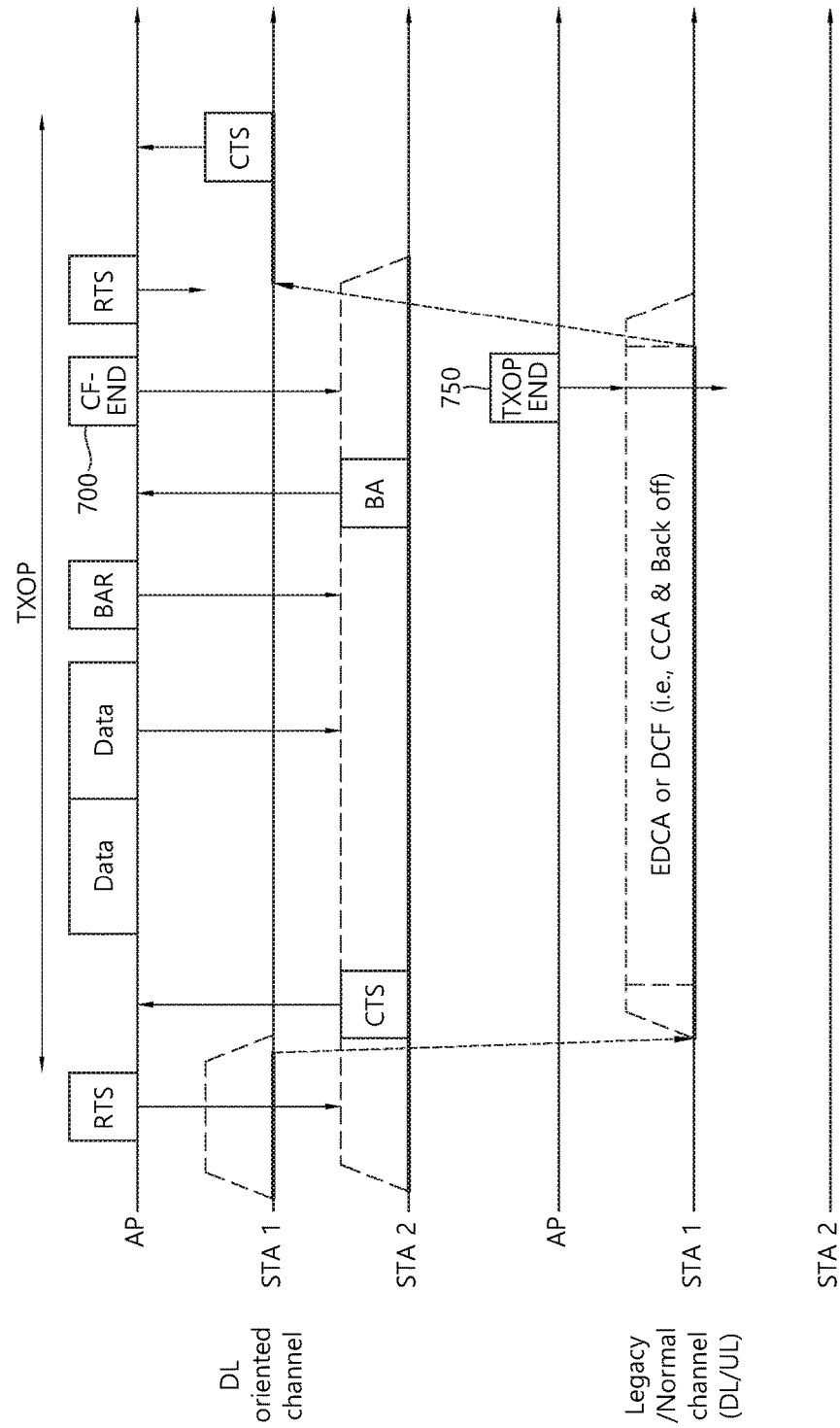
FIG. 7 is a concept view illustrating a method for transmitting an uplink frame performed by an STA according to an embodiment of the present invention.

FIG. 7 is a concept view illustrating a method for transmitting an uplink frame performed by an STA according to an embodiment of the present invention.

FIG. 7 shows a method for transmitting the signal notifying the change of the TXOP to an STA through the normal channel when an AP is trying to change the TXOP configured for the downlink oriented channel.

Referring to FIG. 7, the AP may configure the TXOP for the frame sequence exchange based on the exchange of the RTS frame/CTS frame on the downlink oriented channel. The frame sequence exchange may mean a transmission of a downlink frame and a reception of the response frame in response to the downlink frame. For example, the downlink frame may be a downlink data frame, and the response frame may be a block ACK for the downlink data frame.

When the frame exchange is completed faster than the configured TXOP, the AP may quickly terminate the TXOP. For example, the AP may transmit a contention-free (CF) END frame 700 through the downlink oriented channel. In addition, the AP may transmit the frame that indicates the termination of the configured TXOP through the normal channel. The frame that indicates the termination of the configured TXOP transmitted by the AP through the normal channel may be expressed by the term, a TXOP END frame 750.

Among the STAs that operate in the normal channel, the STA that receives the TXOP END frame 750 of the downlink oriented channel may perform the channel switching from the normal channel to the downlink oriented channel. The information indicating the termination of the configured TXOP which is transmitted by the AP through the normal channel may not be transmitted with being included in a separate frame such as the TXOP END frame 750, but may be transmitted with being included in the conventional CF-END frame 700 through the normal channel. In such a case, after truncating the configured TXOP by transmitting the CF-END frame 700 through the downlink oriented channel, the AP may transmit the TXOP END frame 750 through the normal channel.

The AP may defer the transmission of the downlink frame until the AP transmits the TXOP END frame 750 through the normal channel and the STA performs the channel switching from the normal channel to the downlink oriented channel.

The deferment of the transmission of the downlink frame may be applied only to the STA that operates in an active mode. The deferment of the transmission of the downlink frame may not be applied to the STA that operates in a power save mode.

The power save mode STA to which the deferment of the transmission of the downlink frame is not applied may be an STA in an awake state for receiving the downlink frame through the downlink oriented channel. As described above, the STA in the awake state may be an STA in the awake state by receiving the ACK frame from the AP after receiving a TIM from the AP and transmitting a PS-Poll frame to the AP.

The AP may not consider the transmission of the TXOP END frame 750 or the CF-END frame 700 which is a frame that indicates the termination of the TXOP of the downlink oriented channel which is configured, and may transmit the downlink frame through the downlink oriented channel on the timing that the STA operating in the power saving mode switches to the awake state and receive the downlink frame.

Figure 8:
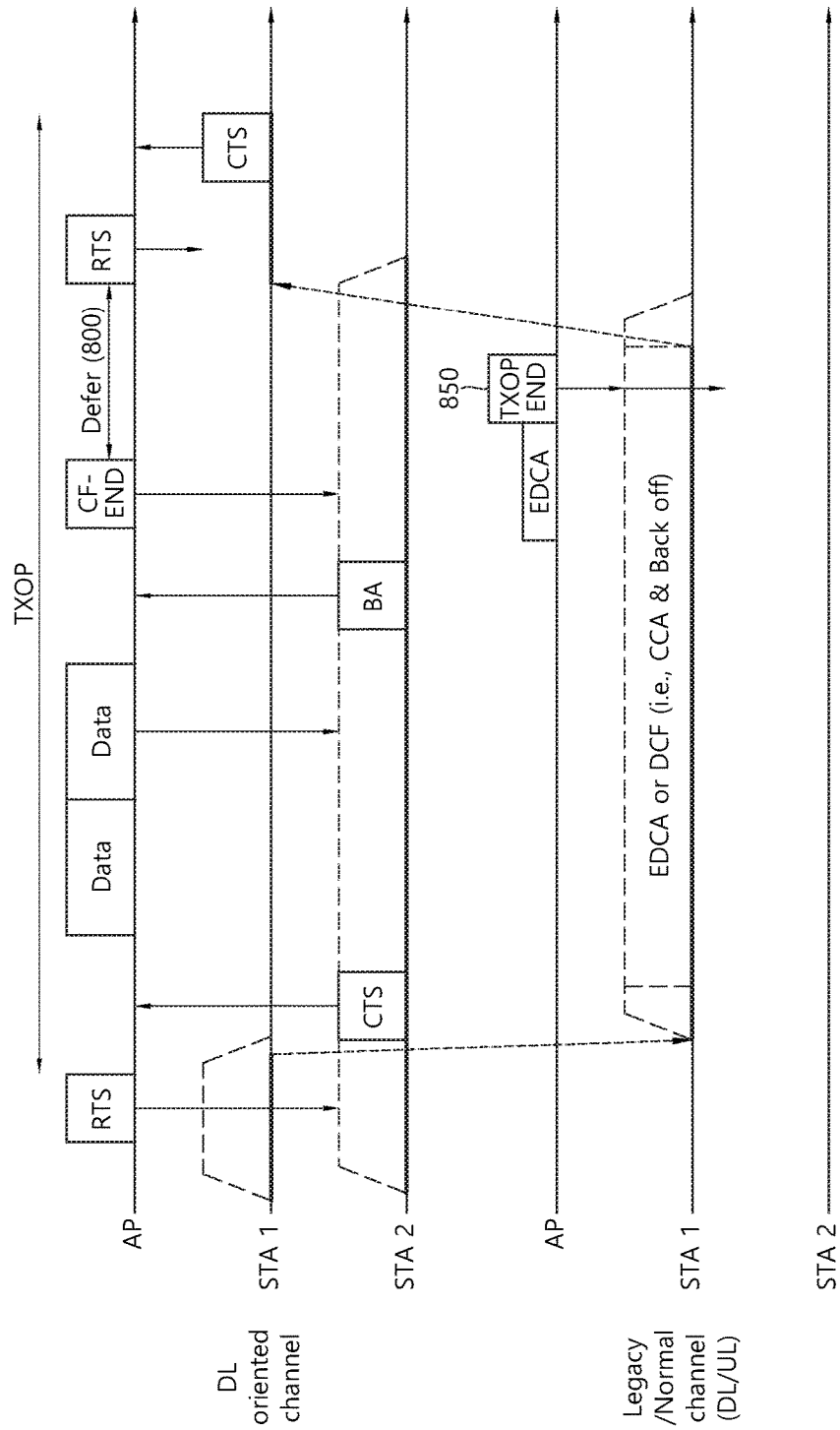
FIG. 8 is a concept view illustrating a method for transmitting an uplink frame performed by an STA according to an embodiment of the present invention.

FIG. 8 is a concept view illustrating a method for transmitting an uplink frame performed by an STA according to an embodiment of the present invention.

FIG. 8 shows a method for deferring the downlink frame transmission performed by an AP through the downlink oriented channel.

Referring to FIG. 8, when the frame exchange sequence is terminated before the configured TXOP is terminated, the AP may transmit a CF-END frame or a TXOP END frame (hereinafter, TXOP END frame) 850 that indicates the termination of the configured TXOP through the normal frame.

When an STA receives the TXOP END frame 850 through the normal channel, the STA may perform the channel switching from the normal channel to the downlink oriented channel.

The AP may defer (800) the downlink frame transmission through the downlink oriented channel during the time interval while the STA performs the channel switching.

After deferring (800) of the transmission of the downlink frame during a predetermined time interval, the AP reconfigure the TXOP through the downlink oriented channel and transmit the downlink frame.

Figure 9:
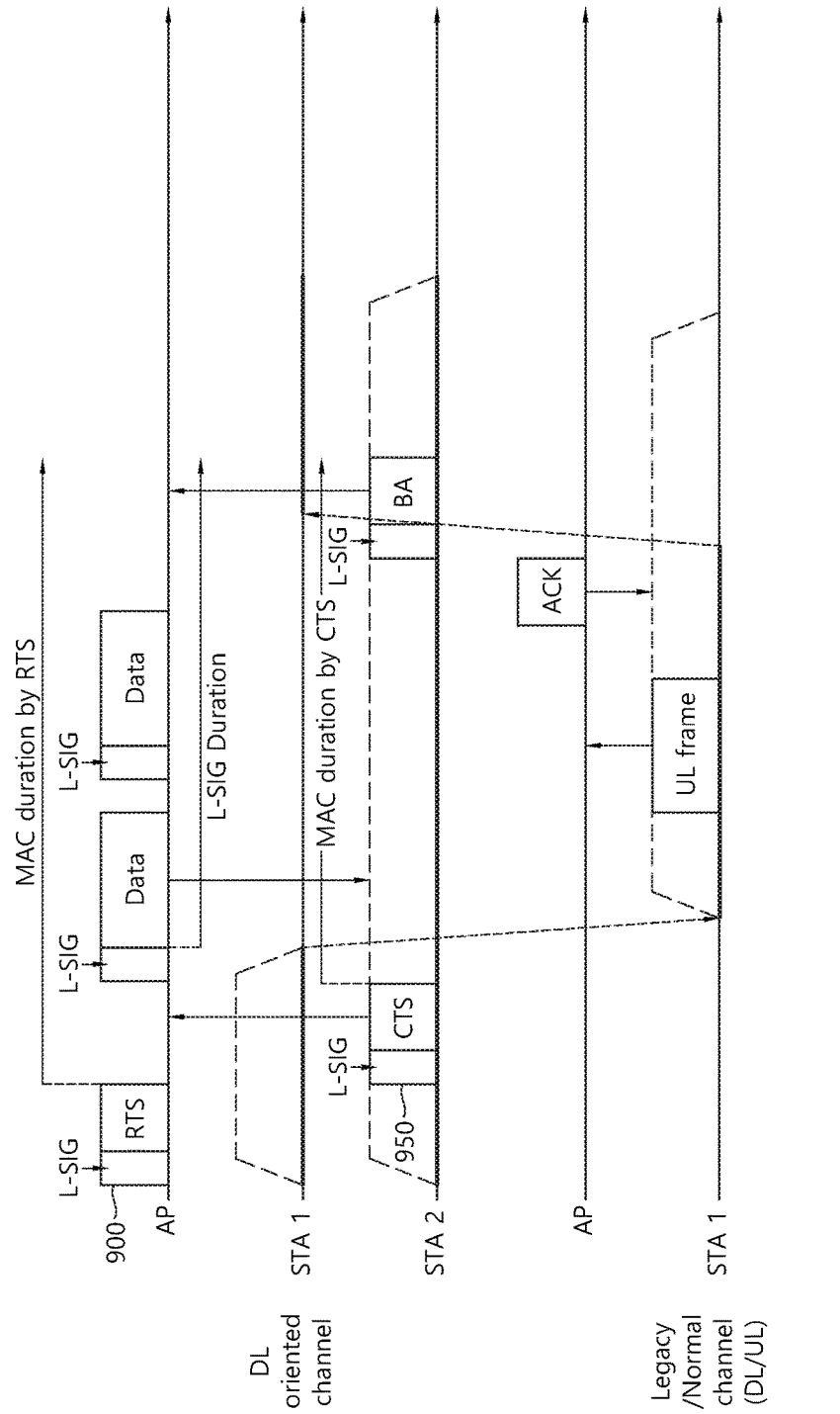
FIG. 9 is a concept view illustrating a method for transmitting an uplink frame performed by an STA according to an embodiment of the present invention.

FIG. 9 is a concept view illustrating a method for transmitting an uplink frame performed by an STA according to an embodiment of the present invention.

FIG. 9 shows a method for an STA to transmit an uplink frame by being switching from the downlink oriented channel to the normal channel by considering a SIG based protection.

Referring to FIG. 9, the TXOP may be configured based on the information of the SIG field which is included in a PPDU header. For example, the information of the SIG field for configuring the TXOP may be the information based on an L-SIG (L-LENGTH and L-DATARATE). Hereinafter, the protection of medium using the TXOP configuration based on the SIG field may be expressed by the term, SIG-based protection.

In the case that the downlink PPDU received by an STA that supports the SIG-based protection is not a PPDU which is targeted to the STA, the STA may perform switching from the downlink oriented channel to the normal channel. In addition, in the case that the STA that supports the SIG-based protection succeeds in decoding the PPDU header but fails to decode a PSDU (or an MPDU) among the received PPDUs, the STA may perform the channel switching to the normal channel by considering the TXOP duration which is determined based on the SIG field. The PSDU (or the MPDU) may include the part except the PPDU header in the PPDU.

The TXOP duration determined based on the SIG field may be the duration determined based on the information included in L-SIG fields 900 and 950 or the duration determined based on the information included in an HT-SIG field. When the duration determined based on the information included in the L-SIG fields 900 and 950 is longer than the duration determined based on the information included in the HT-SIG field, the TXOP duration determined based on the SIG field may be the duration determined based on the information included in the L-SIG fields 900 and 950.

When the STA succeeds in decoding of a MAC header in the MPDU, the NAV may be configured based on the duration field included in the MAC header. In the case that a pending uplink frame is existed, the STA may perform the channel switching to the normal channel in the time resource that corresponds to the configured NAV interval, and may transmit the uplink frame to the AP through the normal channel.

Figure 10:
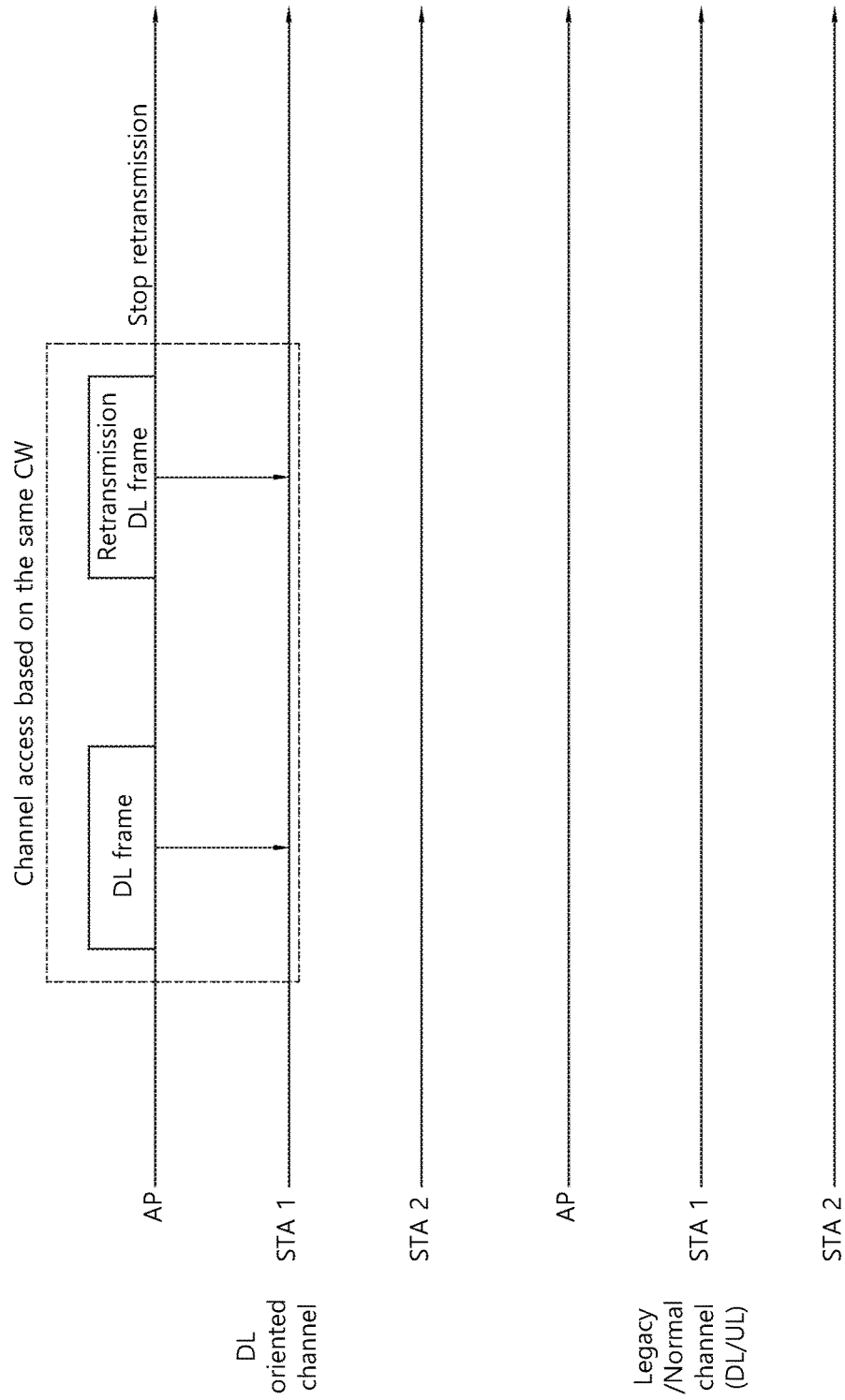
FIG. 10 is a concept view illustrating a method for transmitting an uplink frame performed by an STA according to an embodiment of the present invention.

FIG. 10 is a concept view illustrating a method for transmitting an uplink frame performed by an STA according to an embodiment of the present invention.

An AP may configure a part of channels (e.g., a half of total available channels) as the downlink channel. For example, the channel allocation of 80 MHz channel+80 MHz channel may be used for the normal channel and the downlink oriented channel. In this case, one 80 MHz channel may be configured as the normal channel and the remaining 80 MHz channel may be configured as the downlink oriented channel. The normal channel may include the primary channel and a part of the secondary channels, and the downlink oriented channel may include the remaining secondary channels.

The STA may monitor the downlink frame transmission through the downlink oriented channel from the AP. When the uplink frame is pending on the STA, the STA may transmit the uplink frame to the AP through the normal channel that includes the primary channel. When the uplink frame transmission is completed, the STA may perform the channel switching to the downlink oriented channel, and monitor the downlink frame which is transmitted through the downlink oriented channel.

According to the embodiments of the present invention, the AP may determine the operation channel to which the STA is switched and the STA is currently operating by considering the count of transmission failure of the downlink frame to the STA through the downlink oriented channel. For example, when the transmission failure of the downlink frame through the downlink oriented channel occurs consecutively for more than predetermined counts, the AP may determine that the STA is operating in the normal channel currently.

In addition, according to the embodiments of the present invention, when the downlink frame transmission is failed in the downlink oriented channel, the AP may not perform the exponential backoff, but may perform retransmission as many as predetermined counts by maintaining the conventional contention window (CW). In the conventional WLAN system, when the frame transmission is failed, the size of CW for determining the backoff time for channel access increases exponentially. However, according to the embodiments of the present invention, the AP may perform the retransmission of the downlink frame based on the same CW size even in the case that the downlink frame transmission is failed.

Furthermore, when the STA completes the uplink frame transmission through the normal channel, the STA may transmit the frame that includes the information indicating the completion of the uplink frame transmission or the channel switching to the downlink oriented channel, and perform the channel switching to the downlink oriented channel.

Figure 11:
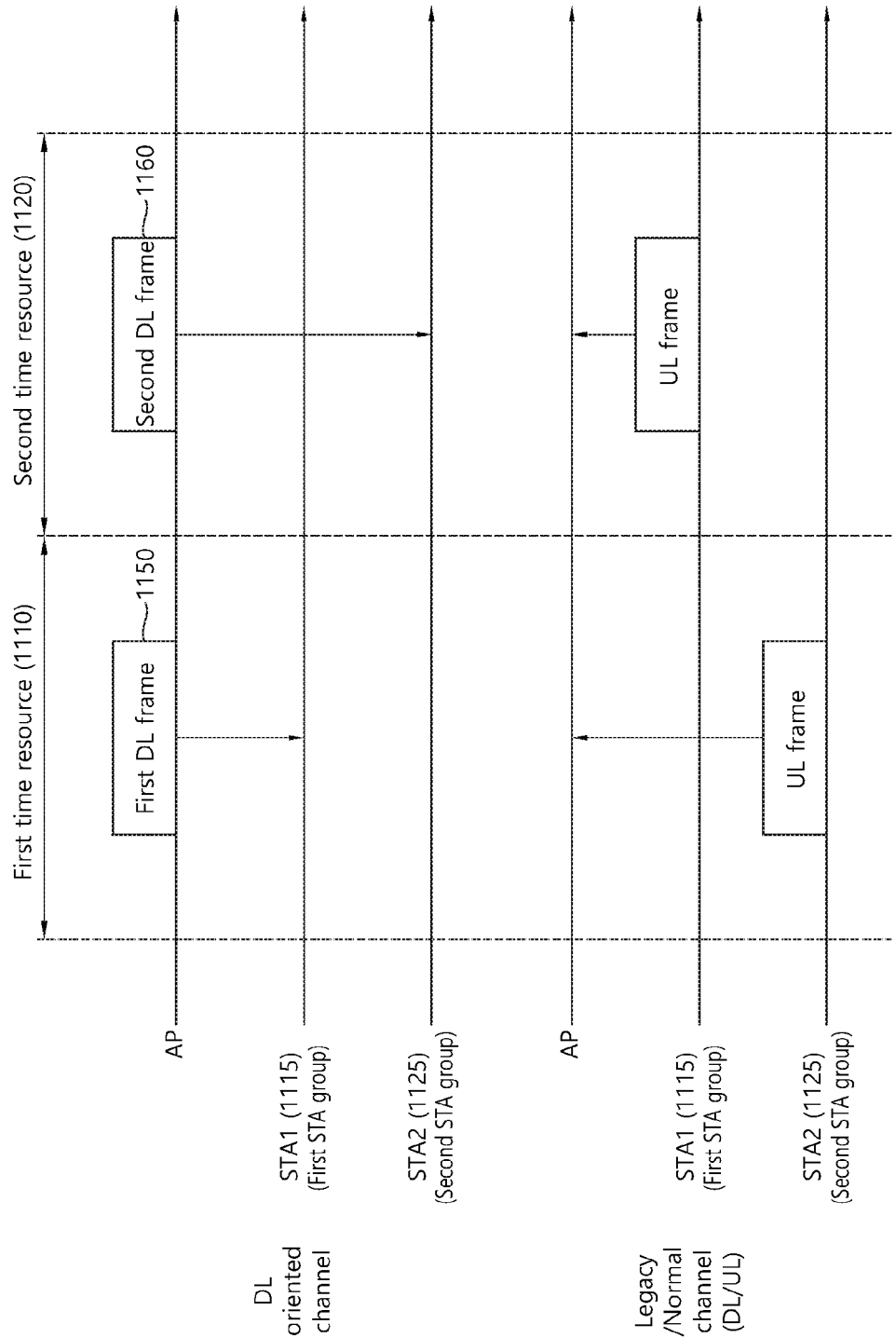
FIG. 11 is a concept view illustrating a method of transmitting the information on the downlink oriented channel to an STA according to an embodiment of the present invention.

FIG. 11 is a concept view illustrating a method of transmitting the information on the downlink oriented channel to an STA according to an embodiment of the present invention.

Referring to FIG. 11, the information on the downlink oriented channel may be transmitted to the STA through a beacon frame/probe response frame. When performing an initial access to an AP, the STA may acquire the information on the downlink oriented channel based on the beacon frame/probe response frame that is received from the AP.

Such information on the downlink oriented channel may include the information on the time when the downlink frame is transmitted from the AP through the downlink oriented channel in addition to the information that indicates a channel used as the downlink oriented channel. For example, the downlink oriented channel may be configured for a predetermined time interval only and used for the downlink frame transmission of the AP. Alternately, the entire time interval may be divided, and the downlink frame may be transmitted through the downlink oriented channel to the STA which is included in a specific STA group on a unit of the divided time interval. As a particular example, a first downlink frame 1150 may be transmitted to an STA1 1115 which is included in a first STA group on a first time resource 1110 through the downlink oriented channel. Further, a second downlink frame 1160 may be transmitted to an STA2 1125 which is included in a second STA group on a second time resource 1120 through the downlink oriented channel.

For such an operation, the beacon frame may include the information on the reception interval (or time resource) for receiving the downlink frame through the downlink oriented channel of an STA group unit that includes a plurality of STAs. The STA included in the specific STA group may transmit the uplink frame on the time resource (or reception interval) on which the downlink frame is not received from the AP. That is, among the interval which is not the reception interval of the downlink frame of the STA, at least a part of the interval may be the transmission interval of the uplink frame of the STA.

The TXOP that is configured for transmitting the downlink frame of the AP may be configured exceeding the downlink frame reception interval configured. The STA may not perform the channel switching to the normal channel in order to transmit the uplink frame until the TXOP that is configured for the downlink frame transmission is terminated. Similarly, the TXOP that is configured for transmitting the uplink frame started from the uplink frame transmission interval of the STA may be configured over the uplink frame transmission interval configured. In such a case, after the termination of the TXOP for the uplink frame transmission, the STA may perform the channel switching to the downlink oriented channel, and may monitor the downlink frame which is transmitted through the downlink oriented channel.

Figure 12:
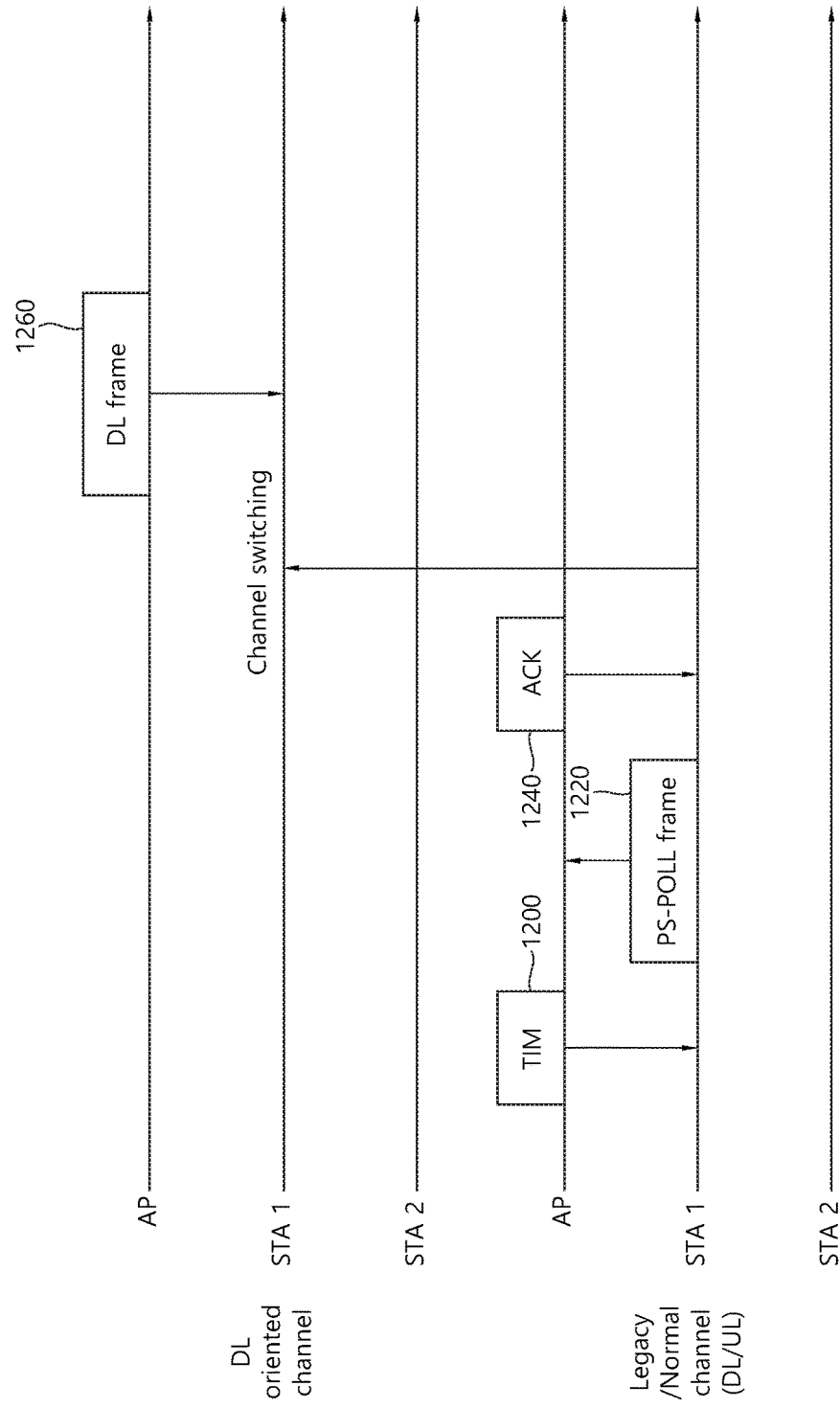
FIG. 12 is a concept view illustrating a method for receiving a downlink frame performed by an STA according to an embodiment of the present invention.

FIG. 12 is a concept view illustrating a method for receiving a downlink frame performed by an STA according to an embodiment of the present invention.

FIG. 12 shows a method for an AP to transmit the downlink frame to the STA which is operated in the power saving mode.

Referring to FIG. 12, when the STA is operated in the normal channel, the AP may transmit a traffic indication map (TIM) 1200 to the STA through the normal channel. The TIM 1200 may include the information that indicates the downlink frame that is to be transmitted to the STA by the AP (or the downlink data that is to be transmitted to the STA pending on the AP). The STA may be operated in the power saving mode, and the TIM 1200 may be included in the beacon frame which is transmitted by the AP.

When receiving the TIM 1200, the STA may transmit a PS-Poll frame 1220 to the AP through the normal channel. When the STA receives an ACK frame 1240 in response to the PS-Poll frame 1220 from the AP, the STA may perform the channel switching to the downlink oriented channel, and may receive a downlink frame 1260 from the AP through the downlink oriented channel.

Figure 13:
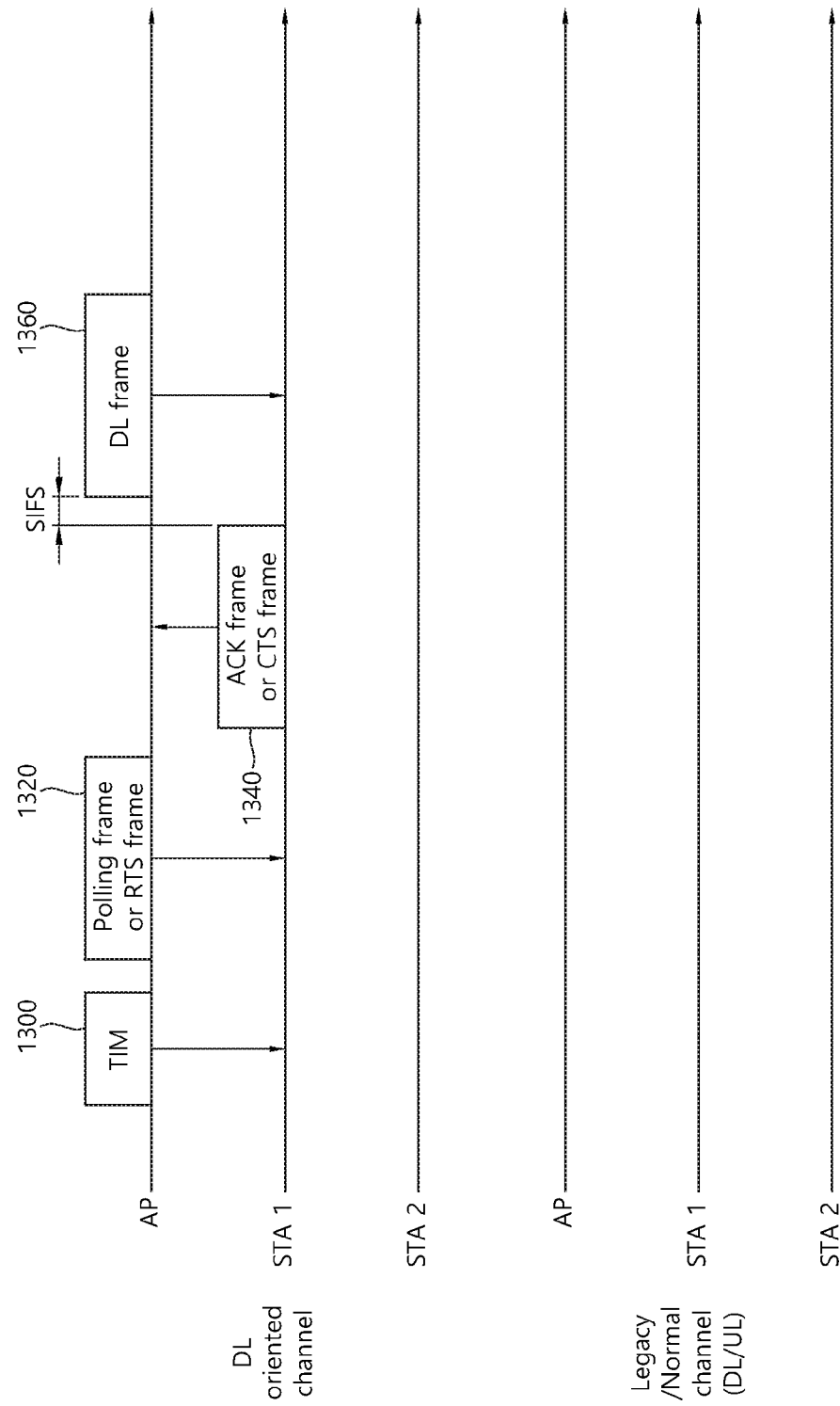
FIG. 13 is a concept view illustrating a method for receiving a downlink frame performed by an STA according to an embodiment of the present invention.

FIG. 13 is a concept view illustrating a method for receiving a downlink frame performed by an STA according to an embodiment of the present invention.

FIG. 13 shows a method for an AP to transmit the downlink frame to the STA which is operated in the power saving mode.

Referring to FIG. 13, the AP may periodically transmit a TIM to the STA that is operated in the power saving mode through the downlink oriented channel. The STA may wake up periodically (or be switched to the awake state) and check the TIM.

After transmitting the TIM 1300 to the STA, the AP may check whether the STA is in the awake state by transmitting a polling frame or an RTS frame 1320 to the STA.

When the STA that is in the awake state receives the TIM, and receives the polling frame or the RTS frame 1320 from the AP, in response to this, the STA may transmit an ACK frame or a CTS frame 1340 to the AP after an SIFS. When receiving the response to the polling frame or the RTS frame 1320 from the STA, the AP may transmit a downlink frame 1360 to the STA after the SIFS.

Figure 14:
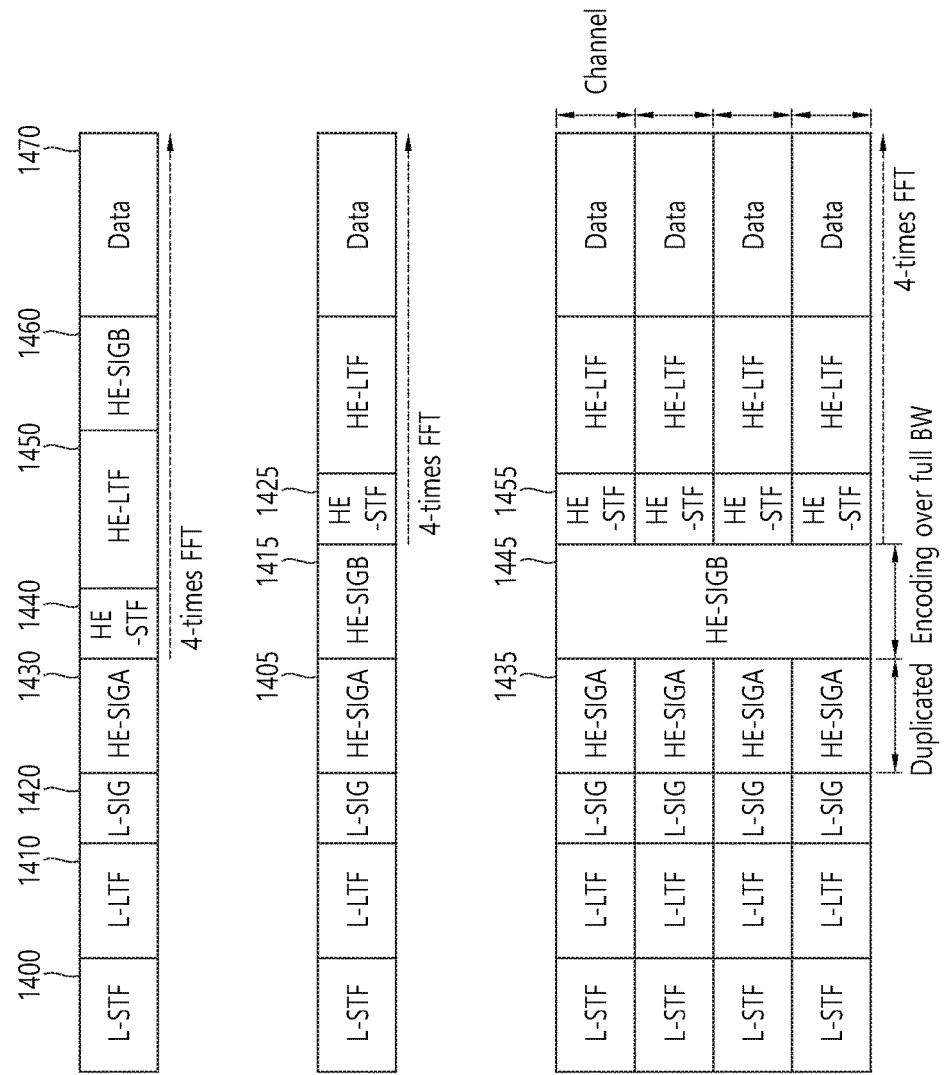
FIG. 14 is a concept view illustrating a PPDU format for performing a transmission of a downlink frame through the downlink oriented channel according to an embodiment of the present invention.

FIG. 14 is a concept view illustrating a PPDU format for performing a transmission of a downlink frame through the downlink oriented channel according to an embodiment of the present invention.

FIG. 14 shows the PPDU format according to an embodiment of the present invention. The PHY header of the PPDU format may include the information for transmitting a downlink frame through the downlink oriented channel and transmitting an uplink frame through the normal channel.

Referring to the upper part of FIG. 14, the PHY header of the downlink PPDU may include a legacy-short training field (L-STF), a legacy-long training field (L-LTF), a legacy-signal (L-SIG), a high efficiency-signal A (HE-SIG A), a high efficiency-short training field (HE-STF), a high efficiency-long training field (HE-LTF) and a high efficiency-signal-B (HE-SIG B). The PHY header up to the L-SIG may be divided into a legacy part and an high efficiency (HE) part after the L-SIG.

The L-STF 1400 may include a short training orthogonal frequency division multiplexing (OFDM) symbol. The L-STF 1400 may be used for frame detection, automatic gain control (AGC), diversity detection and coarse frequency/time synchronization.

The L-LTF 1410 may include a long training orthogonal frequency division multiplexing (OFDM) symbol. The L-LTF 1410 may be used for fine frequency/time synchronization.

The L-SIG 1420 may be used for transmitting control information. The L-SIG 1420 may include the information of data transmission rate and that of data length.

According to the embodiments of the present invention, the HE-SIG A 1430 may include the information for transmitting a downlink frame through the downlink oriented channel and transmitting an uplink frame through the normal channel.

For example, the HE-SIG A 1430 may include the information for indicating the downlink oriented channel. In addition, the HE-SIG A 1430 may include the information for indicating the STA that is to receive the downlink PPDU which is transmitted through the downlink oriented channel. Furthermore, the HE-SIG A 1430 may include the information on a specific STA group that is to receive the downlink PPDU through the downlink oriented channel on a specific time resource and/or the TXOP information for the frame exchange sequence.

Alternately, when the downlink oriented operation channel is allocated by being divided to a plurality of STAs based on the orthogonal frequency division multiplexing access (OFDMA), the HE-SIG A 1430 may include the information on the downlink oriented operation channel which is allocated to each of the plurality of STAs, respectively. The downlink oriented operation channel may include a plurality of lower layer downlink oriented operation channels. For example, based on the OFDMA, among the downlink oriented operation channels of 40 MHz, 20 MHz may be allocated to a first lower layer downlink oriented operation channel which is used for transmitting the downlink frame to STA1, and the remaining 20 MHz may be allocated to a second lower layer downlink oriented operation channel which is used for transmitting the downlink frame to STA2.

In addition, the HE-SIG A 1430 may also include the color bits information for BSS identification information, bandwidth information, a tail bit, a CRC bit, the modulation and coding scheme (MCS) information for the HE-SIG B 1460, the symbol number information for the HE-SIG B 1460 and cyclic prefix (CP; or guard interval (GI)) length information.

The HE-STF 1440 may be used for improving a automatic gain control estimation in a multiple input multiple output (MIMO) environment or the OFDMA environment.

The HE-LTF 1450 may be used for estimating a channel in the MIMO environment or the OFDMA environment.

The HE-SIG B 1460 may include the information on a length MCS of the Physical layer service data unit (PSDU) for each STA, a tail bit, and so on. Further, the HE-SIG B 1460 may also include the information on the STA that is to receive a PPDU and the resource allocation information (or MU-MIMO information) based on the OFDMA. In the case that the resource allocation information (or MU-MIMO information) based on the OFDMA is included in the HE-SIG B 1460, the corresponding information may not be included in the HE-SIG A 1430.

The IFFT size applied to the HE-STF 1440 and the subsequent fields to the HE-STF 1440 and the IFFT size applied to the field before the HE-STF 1440 may be different. For example, the IFFT size applied to the HE-STF 1440 and the subsequent fields to the HE-STF 1440 may be four times greater than the IFFT size applied to the field before the HE-STF 1440. The STA may receive the HE-SIG A 1430, and may be instructed to receive a downlink PPDU based on the HE-SIG A 1430. In such a case, the STA may perform decoding based on the changed FFT size from the HE-STF 1440 and the subsequent fields to the HE-STF 1440. On the other hand, in the case that the STA is not instructed to receive a downlink PPDU based on the HE-SIG A 1430, the STA may stop the decoding and configure the network allocation vector (NAV). The cyclic prefix (CP) of the HE-STF 1440 may have greater size than the CP of other field, and during the CP interval, the STA may decode the downlink PPDU by changing the FFT size.

The order of the field that configures the PPDU format shown in the upper part of FIG. 14 may be changed. For example, as shown in the middle part of FIG. 14, the HE-SIG B 1415 of the HE part may be located immediately after the HE-SIG A 1405. The STA may receive the control information required after decoding up to the HE-SIG A 1405 and the HE-SIG B 1415, and may configure the NAV. Similarly, the IFFT size applied to the HE-STF 1425 and the subsequent fields to the HE-STF 1425 and the IFFT size applied to the field before the HE-STF 1425 may be different.

The STA may receive the HE-SIG A 1405 and the HE-SIG B 1415. In the case that the reception of the downlink PPDU is instructed by the STA identifier field of the HE-SIG A 1405, the STA may decode the downlink PPDU by changing the FFT size from the HE-STF 1425. On the other hand, in the case that the STA receives the HE-SIG A 1405 and the reception of the downlink PPDU is not instructed based on the HE-SIG A 1405, the STA may configure the network allocation vector (NAV).

The lower part of FIG. 14 shows the downlink PPDU format for a downlink (DL) multi-user (MU) transmission. The downlink PPDU may be transmitted to the STA through different downlink transport resources (frequency resource or spatial stream) with each other. That is, the downlink PPDU may be transmitted to a plurality of STAs through the lower layer downlink oriented channel which is included in the downlink oriented channel. On the downlink PPDU, the field before the HE-SIG B 1445 may be transmitted in a duplicated form in different downlink transport resources, respectively. The HE-SIG B 1445 may be transmitted in an encoded form on all transport resources. The field subsequent to the HE-SIG B 1445 may include the individual information for each of a plurality of STAs that receives the downlink PPDU.

When each of the fields included in the downlink PPDU is transmitted through each of the downlink transport resources, the CRC for each field may be included in the downlink PPDU. On the contrary, when a specific field included in the downlink PPDU is encoded and transmitted on all downlink transport resources, the CRC for each field may not be included in the downlink PPDU. Accordingly, the overhead for the CRC may be decreased. That is, the downlink PPDU format for the DL MU transmission according to the embodiments of the present invention may decrease the CRC overhead of the downlink frame by using the HE-SIG B 1445 of the form which is encoded on all transport resources.

For example, the case may be assumed that an AP transmits a downlink PPDU based on the downlink (DL) multi-user (MU) OFDMA transmission through the downlink oriented channel. In the case that the bandwidth of a single lower layer downlink oriented channel is 20 MHz, an STA may be allocated with a downlink transport resource by decoding the HE-SIG A 1435 which is transmitted through a single lower layer downlink oriented channel. For example, the HE-SIG A 1435 may indicate that the downlink oriented channel allocated to the STA is 80 MHz, and the STA may decode the subsequent field to the HE-SIG A 1435 which is transmitted through the downlink oriented channel of 80 MHz.

Similarly, in the downlink PPDU format for the DL MU transmission, the HE-STF 1455 and the subsequent field to the HE-STF 1455 may be encoded based on different IFFT size from the prior field to the HE-STF 1455. Accordingly, when an STA receives the HE-SIG A 1435 and the HE-SIG B 1445 and is instructed to receive a downlink PPDU based on the HE-SIG A 1435, from the HE-STF 1455, the STA may decode the downlink PPDU by changing the FFT size.

Figure 15:
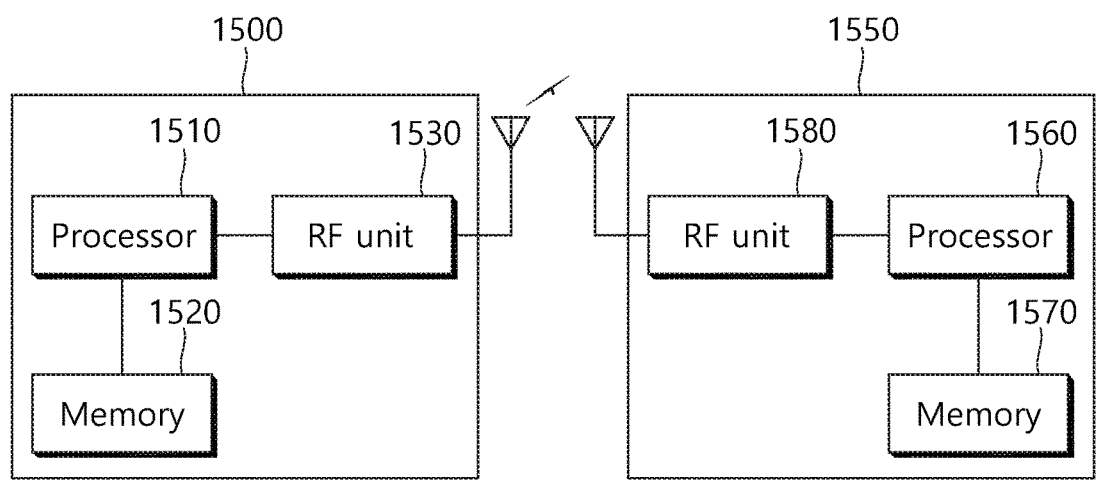
FIG. 15 is a block diagram illustrating the wireless apparatus in which an embodiment of the present invention can be implemented.

FIG. 15 is a block diagram illustrating the wireless apparatus in which an embodiment of the present invention can be implemented.

Referring to FIG. 15, the wireless apparatus 1500 may be an STA that may implement the embodiments described above, and may also be an AP 1500 or non-AP station (or STA; 1550).

The AP 1500 includes a processor 1510, a memory 1520 and a radio frequency (RF) unit 1530.

The RF unit 1530 may be connected to the processor 1510 and transmits/receives the radio signal.

The processor 1510 implements the proposed functions, processes and/or methods. For example, the processor 1510 may be configured to perform the operation of the wireless apparatus according to the embodiments of the present invention described above. The processor may perform the operation of the wireless apparatus described in the embodiments of FIGS. 2 to 14.

For example, the processor 1510 may be implemented to transmit a downlink frame (downlink PPDU) to the STA through the downlink oriented channel. In addition, the processor 1510 may determine whether there is the downlink oriented channel, and in the case that the STA remains in the downlink oriented channel, the processor 1510 may transmit the downlink frame to the STA. Further, when the occupation of the downlink oriented channel is terminated prematurely, the processor 1510 may be implemented to transmit a TXOP END frame to the STA.

The STA 1550 includes a processor 1560, a memory 1570 and a radio frequency (RF) unit 1580.

The RF unit 1580 may be connected to the processor 1560 and transmits/receives the radio signal.

The processor 1560 may implement the proposed functions, processes and/or methods. For example, the processor 1560 may be configured to perform the operation of the wireless apparatus according to the embodiments of the present invention described above. The processor may perform the operation of the wireless apparatus described in the embodiments of FIGS. 2 to 14.

For example, the processor 1560 may be configured to perform: receiving a downlink physical layer protocol data unit (PPDU) from an access point (AP) through a downlink oriented channel, performing a first channel switching from the downlink oriented channel to a normal channel based on information on a transmission opportunity (TXOP) duration for transmitting the downlink PPDU, when indication information of a reception STA of the downlink PPDU does not indicate the STA and there is an uplink frame which is pending on the STA, performing a channel access for transmitting the uplink frame through the normal channel on a time resource that corresponds to the TXOP duration, and performing a second channel switching from the normal channel to the downlink oriented channel based on the information on the TXOP duration.

As described above, the downlink oriented channel allows for the AP to transmit a downlink PPDU based on non-contention and allows for the STA to transmit the response frame in response to the downlink PPDU only, but may restrict for the STA to transmit an independent uplink frame. The independent uplink frame may be a frame which is not the response frame among the uplink frames that are transmitted from the STA to the AP.

The processors 1510 and 1560 may include Application-Specific Integrated Circuits (ASICs), other chipsets, logic circuits, data processors and/or convertors that reciprocally convert baseband signals and radio signals. The memories 1520 and 1570 may include Read-Only Memory (ROM), Random Access Memory (RAM), flash memory, memory cards, storage media and/or other storage devices. The RF units 1530 and 1580 may include one or more antennas to transmit and/or receive the radio signal.

When the embodiment is implemented in software, the aforementioned scheme may be implemented as a module (process or function) that performs the aforementioned function. The module may be stored in the memories 1520 and 1570, and may be executed by the processors 1510 and 1560. The memories 1520 and 1570 may be placed inside or outside the processors 1510 and 1560 and may be connected to the processors 1510 and 1560 using a variety of well-known means.

What is claimed is:

1. A method for transmitting an uplink frame in wireless local network (WLAN), comprising:

receiving, by a station (STA), a downlink physical layer protocol data unit (PPDU) from an access point (AP) through a downlink oriented channel;

performing, by the STA, a first channel switching from the downlink oriented channel to a normal channel based on information on a transmission opportunity (TXOP)

duration for transmitting the downlink PPDU, when indication information of a reception STA of the downlink PPDU does not indicate the STA and there is an uplink frame which is pending on the STA;

performing, by the STA, a channel access for transmitting the uplink frame through the normal channel on a time resource that corresponds to the TXOP duration; and performing, by the STA, a second channel switching from the normal channel to the downlink oriented channel based on the information on the TXOP duration, wherein the downlink oriented channel is used for a transmission of the downlink PPDU based on non-contention by the AP and a transmission of a response frame in response to the downlink PPDU by the STA, wherein the downlink oriented channel is not used for a transmission of an independent uplink frame by the STA, and wherein the independent frame is an uplink frame which is not the response frame among uplink frames transmitted from the STA to the AP.

2. The method of claim 1, wherein the first channel switching is performed when the TXOP duration is longer than a threshold switching time, and wherein the threshold switching time is determined based on a time resource which is required for transmitting the uplink frame.

3. The method of claim 1, wherein the uplink frame is transmitted to the AP based on the channel access, when the channel access is successful until a threshold access time, and wherein the threshold access time is determined based on a time resource which is required for transmitting the uplink frame within a time resource that correspond to the TXOP duration.

4. The method of claim 1, when the STA receives a TXOP END frame during the channel access from the AP, wherein the STA stops the channel access, and performs a channel switching from the normal channel to the downlink oriented channel before a time of performing the second channel switching.

5. The method of claim 1, wherein the TXOP duration is determined based on a duration field of a request to send (RTS) frame which is transmitted by the AP.

6. A station (STA) for transmitting an uplink frame in wireless local network (WLAN), comprising:
a radio frequency (RF) unit configured to transmit or receive a radio signal; and
a processor operatively connected to the RF unit,
wherein the processor is configured to perform:

receiving a downlink physical layer protocol data unit (PPDU) from an access point (AP) through a downlink oriented channel;

performing a first channel switching from the downlink oriented channel to a normal channel based on information on a transmission opportunity (TXOP) duration for transmitting the downlink PPDU, when indication information of a reception STA of the downlink PPDU does not indicate the STA and there is an uplink frame which is pending on the STA;

performing a channel access for transmitting the uplink frame through the normal channel on a time resource that corresponds to the TXOP duration; and performing a second channel switching from the normal channel to the downlink oriented channel based on the information on the TXOP duration, wherein the downlink oriented channel is used for a transmission of the downlink PPDU based on non-contention by the AP and a transmission of a response frame in response to the downlink PPDU by the STA, wherein the downlink oriented channel is not used for a transmission of an independent uplink frame by the STA, and wherein the independent frame is an uplink frame which is not the response frame among uplink frames transmitted from the STA to the AP.

7. The STA of claim 6, wherein the first channel switching is performed when the TXOP duration is longer than a threshold switching time, and wherein the threshold switching time is determined based on a time resource which is required for transmitting the uplink frame.

8. The STA of claim 6, wherein the uplink frame is transmitted to the AP based on the channel access, when the channel access is successful until a threshold access time, and wherein the threshold access time is determined based on a time resource which is required for transmitting the uplink frame within a time resource that correspond to the TXOP duration.

9. The STA of claim 6, when the RF unit receives a TXOP END frame during the channel access from the AP, wherein the processor stops the channel access, and performs a channel switching from the normal channel to the downlink oriented channel before a time of performing the second channel switching.

10. The STA of claim 6, wherein the TXOP duration is determined based on a duration field of a request to send (RTS) frame which is transmitted by the AP.

* * * * *